United States Patent [19]

Rekstad et al.

[11] Patent Number: 5,460,164
[45] Date of Patent: Oct. 24, 1995

[54] SOLAR HEAT COLLECTOR ROOFS

[75] Inventors: John Rekstad, Fjellhamar; Mari Mehlen, Olso, both of Norway

[73] Assignee: Solnar AS, Oslo, Norway

[21] Appl. No.: 300,588

[22] Filed: Sep. 2, 1994

Related U.S. Application Data

[63] Continuation of Ser. No. 949,555, filed as PCT/NO91/00072, May 21, 1991, abandoned.

[30] Foreign Application Priority Data

May 18, 1990 [NO] Norway ............................ 902215

[51] Int. Cl.⁶ ........................... F24J 2/24; F24J 2/00
[52] U.S. Cl. ..................... 126/714; 126/621; 126/663; 126/675
[58] Field of Search .................... 126/621, 622, 126/623, 675, 663, 651

[56] References Cited

U.S. PATENT DOCUMENTS

| | | | |
|---|---|---|---|
| 1,101,001 | 6/1914 | Willsie. | |
| 3,215,134 | 11/1965 | Thomason. | |
| 3,236,294 | 2/1966 | Thomason | 126/675 |
| 3,254,643 | 6/1966 | Thomason | 126/675 X |
| 3,270,739 | 9/1966 | Thomason | 126/271 |
| 3,965,887 | 6/1976 | Gramer et al. | 126/271 |
| 3,995,804 | 12/1976 | Folds et al. | 126/623 X |
| 4,085,732 | 4/1978 | Hysom | 126/675 |
| 4,103,674 | 8/1978 | Robinson, Jr. et al. | 126/621 X |
| 4,124,020 | 11/1978 | Noble | 126/645 |

FOREIGN PATENT DOCUMENTS

| | | | |
|---|---|---|---|
| 0005701 | 12/1979 | European Pat. Off. | F24J 3/02 |
| 0069103 | 1/1983 | European Pat. Off. | F24J 3/02 |
| 0149223 | 5/1983 | Norway | F24J 3/02 |

Primary Examiner—Carl D. Price
Attorney, Agent, or Firm—Ladas & Parry

[57] ABSTRACT

A solar heat collector roof comprises an absorber plate (1) for incident radiation energy and a heat exchange plate (2) placed directly thereunder. The heat exchange plate is corrugated in such a manner that it comprises channels extending down along the roof. The heat exchange plate (2) is moreover in direct contact with the absorber plate (1) thereabove. A heat carrying or heat removing liquid medium (3), e.g. water, flows in the channels. The liquid medium (3), which removes heat from the heat exchange plate (2), is supplied at such a rate that the flow rate down along the roof in the channels lies below the rate at which the surface tension of the heat carrying medium (3) is broken, so that a winding and travelling flow pattern is imparted thereby to the liquid medium (3), and up along the channel walls (4).

12 Claims, 3 Drawing Sheets

SOLAR HEAT COLLECTOR ROOFS

This is a continuation of application Ser. No. 07/949,555 filed as PCT/NO91/00072, May 21, 1991 now abandoned.

BACKGROUND OF THE INVENTION

The present invention relates to an improvement in solar heat collector roofs comprising a heat carrying or heat removing medium, e.g. water, flowing down said roof in channels formed by corrugations in a heat exchange plate, and said solar heat collector roof preferably also comprises a translucent and insulating cover plate system as an upper and outer layer.

In addition to the characteristics of this roof in connection with collecting solar energy, the solar collector roof in accordance with the invention constitutes a "complete" roof construction in the sense that there is no need of other structures under the roof, than rafters/laths upon which said roof shall be laid and fastened. The roof thereby becomes watertight, without any need of further layers for reinforcement/sealing.

DESCRIPTION OF THE PRIOR ART

There are previously known solar heat collector roofs of a type which comprises means for supplying water at the roof summit and for collecting this water at the lower roof edge after heating the water by passage thereof between a plate for absorption of incident radiation energy and a translucent and insulating outer cover plate.

Several experiments have been made regarding solar energy houses. One of these experiments is the Soltun project which is situated in Jelly near Moss in Norway. The housing estate consists of seven houses built around a country courtyard. In this case two layers of corrugated aluminum roof plates have been used as a solar collector, water flowing between these two layers. The plates are covered by a transparent double polycarbonate layer of the type ordinarily used in greenhouses. The waterflow system consists of distribution and collection channels, and is constructed specially for this project.

From European patent publication no. 69103 there is known a solution where cooling liquid flows as a film on the underside of a radiation absorber plate, utilizing the surface tension of the cooling liquid as well as the cohesion forces between the liquid and the absorber plate. Thereby good thermal contact is obtained between the absorber and the liquid, and simultaneously the absorber plate prevents the liquid vapour from reaching the cover plate situated above. However, it is obvious that such a solution needs a separate roof on the underside, i.e. this solution cannot in itself constitute a complete roof.

Further there is known from European patent publication no. 5701 a device where cooling liquid flows on top of an absorber plate in channels constituted by profiled channels in the absorber, and with a translucent cover plate laid closely down upon the absorber as an upper boundary. Thus, the radiation will in this case pass through the liquid before it is absorbed in the absorber plate. In this case a very good thermal contact is achieved between cooling liquid and absorber.

For a comparison, the present invention is based inter alia upon the fact that water shall not fill the channels in the heat exchange plate mentioned in the introduction. In order that heat shall be transferred to the water, it must therefore be transferred first from a specially provided absorber plate to the heat exchange plate, in the places where these plates are in metallic contact with each other, and thereafter the heat is conducted in the walls of the heat exchange plate channels before it can be transferred to the water flowing in these channels. The two patent publications mentioned above show solutions with good heat transfer, because the liquid is in direct physical contact with the absorber plate. However, with the solution in accordance with the present invention heat transfer from the absorber to the cooling liquid is somewhat more problematic. The solution of this problem is the basis of the present invention.

Of course it is natural to pose the question regarding why one should select suggesting a solution where heat exchange is a problem, when there are previously known solutions of this problem. However, it should be noted that an indirect heat transfer of the type appearing in the present invention, has constructional advantages regarding the solution when viewed in its entirety, and this makes the solar collector principle of the present invention more effective and favourable as a total solution, than the solutions of the two publications mentioned above.

It should also be noted that the two mentioned publications represent solutions which still imply problems in relation to a technical/economical utilization of solar heat in the form of solar collectors in roofs.

Thus, the patent publication EP 69103 describes only part of the complete roof solution, as mentioned in the introduction. When this principle is used in solar heat collectors on a roof, there must be a further roof below the solar collector, said further roof preventing liquid drops and vapour from penetrating down into the house. Further, the translucent cover plate in the construction in accordance with EP 69103 must bear the mechanical strains to which a roof normally can be exposed, in the form of wind and snow loads, since the liquid film would be broken up by the mechanical supports which in the alternative case would have to be erected from an under-roof to the cover plate.

Besides, experiments conducted by the inventors show that the solution mentioned above is very critical as to requirements regarding the nature of the metal surface and the liquid for maintaining such a liquid film. It must therefore be supposed that the construction mentioned above is not well suited to be able to maintain a stable operation during many years.

European patent publication no. 5701 describes a construction where liquid flows on top of the absorber plate, and where cover plate, absorber and/or liquid have been treated so as to reduce or avoid evaporation and condensation. A disadvantage of such a solution is that the cover plate provides poor heat insulation when it lies tightly upon the absorber.

Besides, the transparent cover plate will imply that the liquid flow will be visible from the outside. This is an aesthetical problem which has not been solved in the construction of EP 5701, and which limits the usefulness of this solution.

Also, in the solution mentioned above a cooling liquid must be used which does not evaporate and condense. In other words, clean water cannot be used in this solar collector, which entails that the heat must be transferred via a heat exchange unit to the rest of the heating system. An extra heat exchange unit has economical as well as operational consequences.

SUMMARY OF THE INVENTION

The problems mentioned above are eliminated, and at the same time a simpler construction is provided of a solar heat collector which is easily adaptable to any roof without special constructions, by putting into use an improvement of the kind mentioned in the introduction, and with the particular features stated in the characterizing part of the enclosed patent claim 1.

Thus, in accordance with the present invention the cooling liquid flows on the underside of the absorber plate, and therefore is not visible from the top/front. The absorber plate prevents water vapour in reaching the cover plate, so that the condensation problem is avoided. The cover plate can be mounted with an optimum spacing from the absorber plate regarding insulation, and the solar collector has mechanical characteristics providing a distribution and transfer of loads on the cover plate, to a rafter layer thereunder.

The remaining problem, which is clearly specific to the present construction, and not to the publications mentioned above, is the ability to provide an effective heat transfer from the absorber plate via the heat exchange plate to the cooling liquid (the water).

Thus, the object of the present invention is to bring the water as close as possible to the absorber plate, however in such a manner that it flows in a stable manner upon the heat exchange plate. To achieve this, one utilizes the per se well known characteristic that water in small quantities will not flow rectilinearly in a string, but due to contact tensions, friction and surface tensions tends to flow in windings, i.e. meander fashion.

It should also be noted that when the roof, and thereby the channels in which water flows, has an angle of inclination, the water will maintain this meander pattern while flowing down the channel. When a suitable shape (cross section) of the channel is selected, the water will partly flow in the channel bottom, partly on the channel sides. When water flows on the channel sides, the distance between water and absorber becomes smaller, and conduction resistance to heat becomes less. In other words, here the heat is transferred easier than if the water stayed along the bottom of the channel.

When the improvement in accordance with the invention merely consists of a cover plate, an absorber, a corrugated heat exchange plate as well as an insulation plate thereunder, the construction is cheaper than the previously mentioned ones regarding material consumption. The channels for guiding the heat carrying medium is quite simply constituted by the corrugations, which are connected to the water supply and water collecting channels respectively along the summit of and at the lower edge of the roof. The fact that the absorber plate is flat, makes it simpler to support the cover plate, and therefore an improved insulation situation is achieved on the outside of the absorber plate. Moreover, the water courses become simple, and the risk of stopping up due to extraneous matter will be less, since the water courses are relatively large in cross section. As a consequence of the fact that the water quantity supplied is controlled in such a manner that the surface tension keeps the water from breaking up, a winding will be created which will bring the water further into contact with parts of the corrugated plate, and thus the water absorbs additional heat quantities in relation to the situation where the water runs straight along the channel bottom.

The mechanism forming the basis of the above mentioned winding phenomenon, is supposed to be the friction between the water and the channel surface, and between the water layers and the water surface (the surface tension). The friction between water and channel surface is the larger one, therefore the water velocity is slowed down on the underside. Water above the lower layer will flow somewhat faster, but the surface tension will maintain the water as an aggregate. The result hereof is a winding, and as soon as such a winding is developed, the mechanism mentioned above will seek to enhance the winding phenomenon. This flow pattern will be maintained as long as the flow rate is sufficiently small not to break the surface tension.

When the water creeps up the channel wall, one component of the water weight, seeking to counteract the winding, will increase. Therefore the beam of water will swing back and over toward the opposite channel wall. The total wave pattern will move down the channel, in such a manner that over time a large part of the channel bottom and walls will come into direct contact with the water.

Further characteristics and features of the present invention will appear from the rest of the apparatus claims, and from claims regarding a method of removing heat from a solar heat collector roof of the type here in question.

BRIEF DESCRIPTION OF THE DRAWINGS

In the following the invention shall be described further, with reference to the enclosed drawings, where.

DESCRIPTION OF THE PREFERRED EMBODIMENTS

Figure 1:
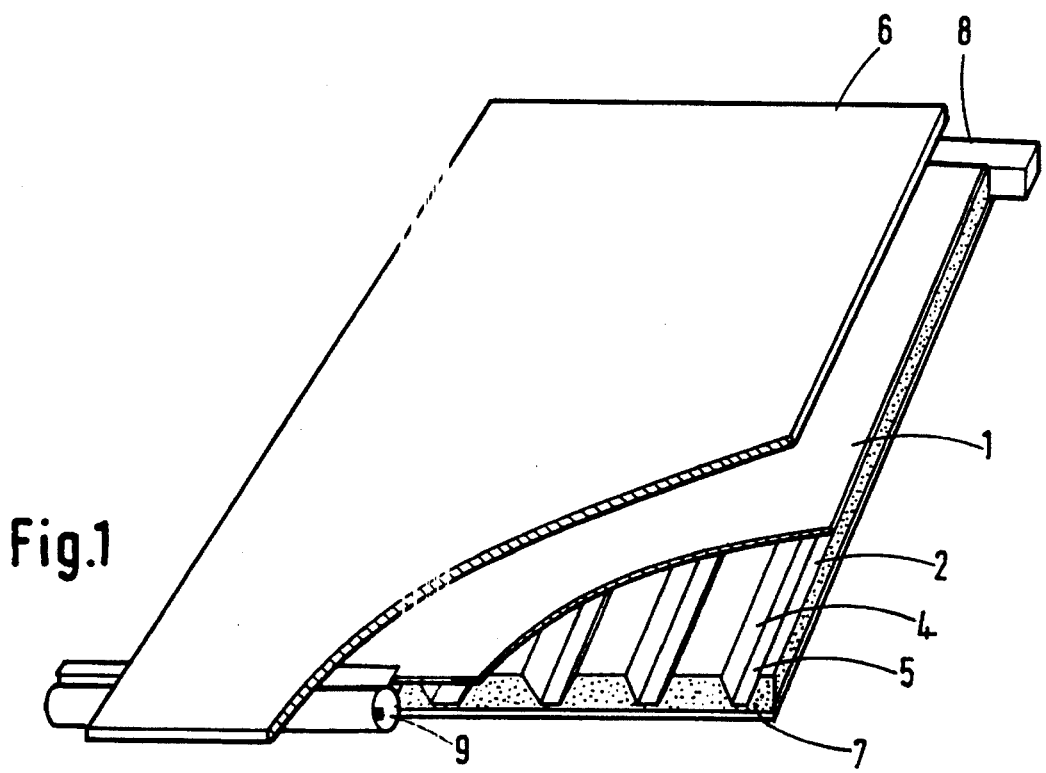
FIG. 1 shows a solar heat collector device constructed in accordance with the present invention, in a partial cross section view.
Figure 2:
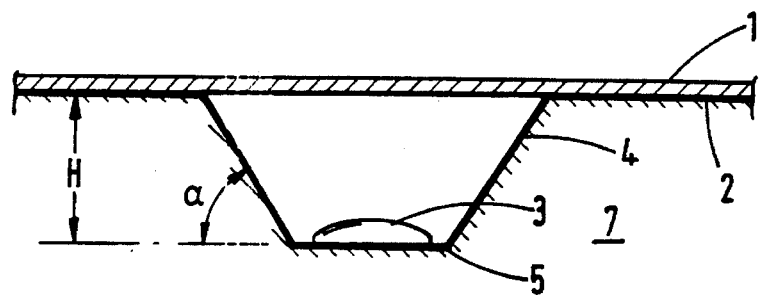
FIG. 2 shows a schematical section through a part of the solar collector, i.e. only part of the absorber plate and the corrugated channel plate is shown.

In FIG. 1 is shown an embodiment of the solar roof construction, where a corrugated plate 2 of e.g. aluminum is provided upon an insulation layer 7, and upon the corrugated plate 2 there is placed an absorber plate 1. Further there is a cover plate 6 above the absorber plate. Said cover plate 6 may e.g. consist of translucent polycarbonate material. The absorber plate 1 may consist of aluminum, and it can be coated by black colour in order to absorb heat as well as possible. The corrugated aluminum plate 2 may be equipped with a relatively smooth surface, formed by slight anodizing and painting of the aluminum plate. In the embodiment shown, the corrugations form channels with a bottom 5 and side walls 4 constituting a trapezium with a cross section as indicated in FIG. 2. The channels have their supply of water via a distribution channel 8 at the roof top, and the water flowing down the channels due to gravity, is collected in a collecting pipe 9. The collecting pipe 9 may e.g. lead to a tank, from which the water is pumped up again to the distribution channel 8.

The construction shown in FIG. 1 provides a solar roof construction which is rigid and easily handled. The height H of the channels should as a starting point have been as small as possible, in order to give the water contact with the absorber plate 1 itself, however this is not possible because the mechanical strength of the roof is reduced with a decrease in height H. Thus, the height H is dependent on the requirements set regarding roof strength. Therefore, in order to utilize maximally the heat absorbed by absorber 1, it should be necessary that the water fills the whole channel. However, this would result in a roof which would become very heavy, and therefore rather unsuitable. In order to avoid such a situation it has been found that it is possible to make the water passing through the channel undertake a winding motion up along the channel walls 4, so that the water can draw heat from areas situated rather near the absorber plate, even when there is a relatively low water flow rate in each channel. This winding mechanism is as previously described dependent on the friction between water and channel surface, and of the surface tension.

Figure 4:
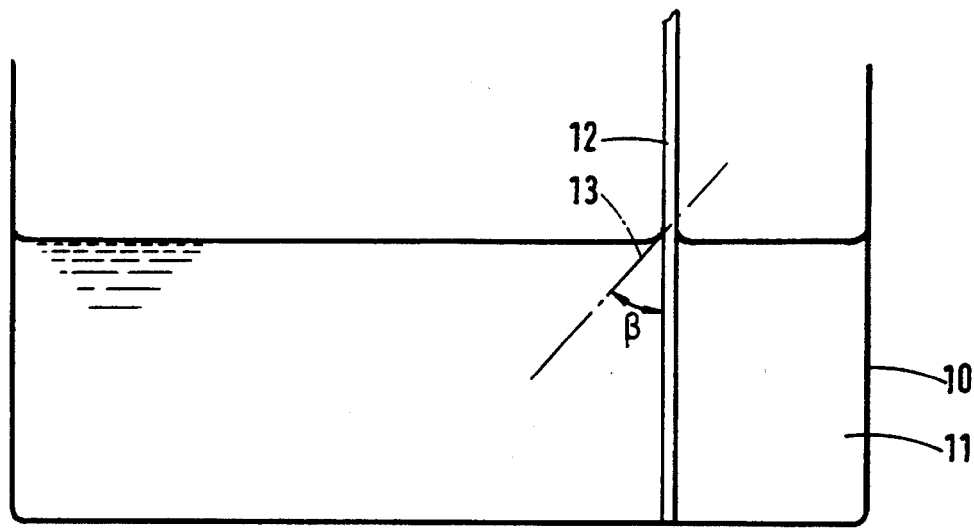
FIG. 4 shows schematically a set-up for measuring the wetting characteristics of a plate.

The side surface and the channel bottom must also have such a constitution that the water wets these surfaces only to a small degree. It is possible to measure separately the degree of wetting of a surface by a certain liquid, by immersing a plate 12 of a corresponding material as the one to be used, in our case as a corrugated plate, in a vessel 10 containing liquid 11, see FIG. 4. In our case the liquid is water. Plate 12 is placed perpendicularly in relation to the water surface in the vessel. The water will pull itself up along plate 12, depending on surface treatment. The rim angle β between the tangent 13 to the water surface up along plate 12, and plate 12, is a measure of wetting. The deciding parameter regarding the value of this angle β is, as previously mentioned, the surface treatment of the plate. In order to achieve the desired winding, the corrugated heat exchange plate 2 should have a surface treated so that the wetting rim angle β is larger than 60°.

Besides, the windings can be regulated by means of water flow rate. However, there will be different inclinations for different roof constructions, and the flow rate will take on different values depending on roof angle. In order to achieve the same velocity or flow rate at different roof angles, and in order that the flow rate shall not exceed the rate which implies that the surface tension is broken, the water quantity supplied must be adapted to the roof angle. However, the windings are also dependent on the friction between the water and the channel bottom 5, and therefore it is necessary to adapt the water quantity supplied in distribution channel 8 also with due consideration to the surface treatment of the channel. This surface treatment can be e.g. a slight anodizing of the aluminum plate, and it may be provided with paint. It has turned out that the width of bottom 5 advantageously can be in the range 1–10 cm. It has also turned out that the flow rate of the water preferably can be in the range 0,1–1 l/min. for each channel. The water temperature may then be between 10° and 80° C. The roof inclination angle may vary within wide limits, i.e. between 20° and 85°.

Figure 6:
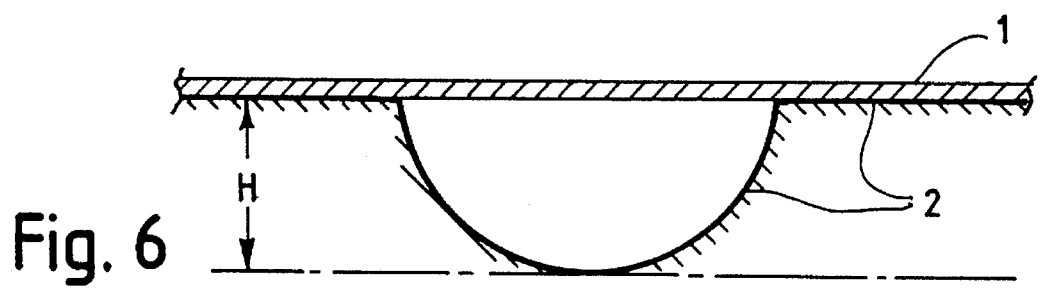
FIG. 6 shows a schematical section through a part of the solar collector, illustrating the corrugated channel in a half cylinder shape.

Alternatively, each channel may have a cross section with approximately half cylinder shape as shown in FIG. 6. Its diameter is in a range of 1–10 cm.

Figure 3:
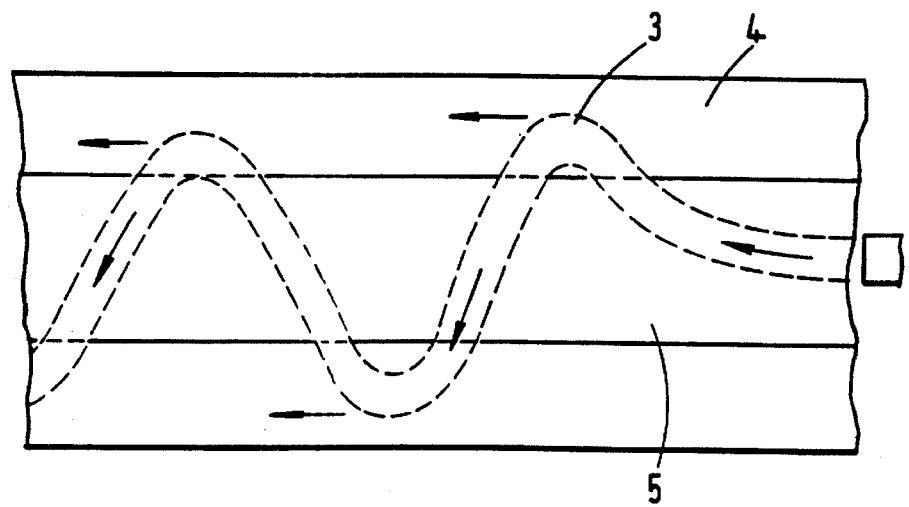
FIG. 3 shows a sketch of the water track pattern in a channel.

From the above it should appear clearly that the flow rate necessary to make the desired winding pattern indicated in FIG. 3 appear, depends on several parameters, and these parameters are difficult to calculate for each particular example. Thus, the simplest method is to adjust the flow rate after mounting the roof by adjusting the pumped quantity of water in such a manner that the flow rate approaches the maximum allowed value in the particular case.

Figure 5:
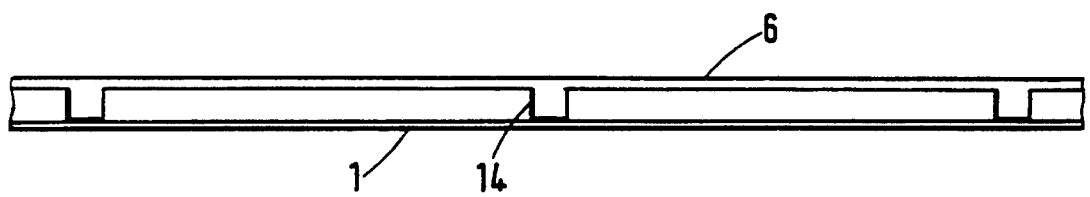
FIG. 5 shows in sketchlike fashion a section through a cover plate with integrated fixing profiles, as well as detailed sketches showing inter alia a joining method.
Figure 5:
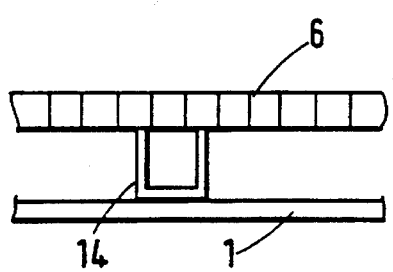
Figure 5:
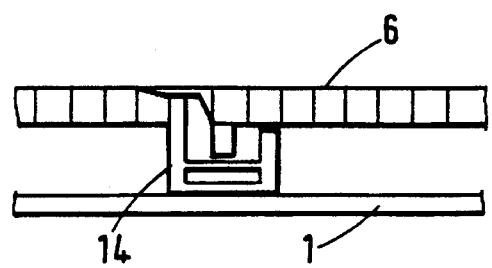

In FIG. 5a is shown a particular embodiment of the cover plate system, made possible by the special construction thereunder, with absorber plate 1 upon a heat exchange plate 2 as previously mentioned. In order to achieve as good an insulation as possible against heat "leaking out" toward the roof top side from absorber plate 1, spacer elements or fixing profiles 14 are formed of the same insulating material as the other parts of the cover plates 6, and integrated with the cover plates 6, i.e. as a unity therewith. Simultaneously there is provided an optimum distance up to cover plate 6 regarding heat conduction by convection. This optimum distance depends inter alia on roof inclination, and lies in a range about 10 mm. Cover plates with such integrated fixing profiles 14 of e.g. polycarbonate material can be manufactured directly and simply by extruding.

FIG. 5b shows in detail a fixing profile 14 integrated with a cover plate 6, where said fixing profile 14 is hollow. FIG. 5c shows a joint between two such cover plates 6, where a fixing profile 14 is placed on the edge of a cover plate.

We claim:

1. A method of removing heat from a solar heat collector roof with a translucent and insulating cover plate system as upper layer, including steps of supplying a heat carrying or heat removing liquid medium flow down along said roof in channels formed by corrugations of a heat exchange plate, and absorbing incident radiation energy by an absorber plate provided under the cover plate system, said absorber plate covering said heat exchange plate and being in direct heat transfer contact therewith, wherein said liquid medium, dependent on parameters of roof inclination, surface nature of the heat exchange plate forming the channels, and shape of channel cross section, is supplied from a roof summit at such a rate that a stable flow rate of said liquid medium down along said roof in each channel is below a rate at which a surface tension of said medium is broken, whereby a winding and travelling flow pattern is imparted to the heat carrying liquid medium, and up along side walls of said channels.

2. The method of claim 1, wherein the flow rate of said liquid medium is adjusted within a range of 0.1–1 l/min for each channel.

3. A solar heat collector which is disposed in an inclined position to have an upper end and a lower end, comprising a translucent and insulating cover plate, an absorber plate for absorbing incident radiation energy disposed under the cover plate, and a heat exchange plate placed directly under the absorber plate for direct heat transfer therewith, said heat exchange plate being corrugated to form channels for flowing a heat carrying or heat removing liquid medium introduced at the upper end of the heat collector, surfaces of said channels of the heat exchange plate being treated by slight anodizing and painting to acquire a predetermined wetting rim angle so that a stable flow rate of said liquid medium flowing down in each channel is below a rate at which a surface tension of said medium is broken, whereby said liquid medium displays a winding and travelling flow pattern and runs up along channel walls.

4. The collector of claim 3, wherein each said channel has substantially a trapezium-shaped cross section, said trapezium having a height H and a trapezium inclination angle α selected in consideration of requirements of strength and mechanical characteristics of the roof, and a bottom width in a range of 1–10 cm.

5. The collector of claim 3, wherein each said channel has a cross section of approximately half cylinder shape with a diameter in a range of 1–10 cm.

6. The collector of claim 3, wherein said absorber plate is made of aluminum preferably coated by black color.

7. The collector of claims 3, 4, or 5, wherein said heat exchange plate is made of aluminum, preferably treated by anodizing or painting process to obtain the desired channel surfaces.

8. The collector of claim 3, wherein the surface of said heat exchange plate is treated to give a rim angle β larger than 60° in a wetting test regarding water against said surface.

9. The collector of claim 3, wherein a layer of insulating material is placed directly below the heat exchange plate.

10. The collector of claim 3, wherein the flow rate of said heat carrying medium is adjustable in a range of 0.1–1 l/min. for each said channel.

11. The collector of claim 3, wherein said cover plate system includes a cover plate and fixing profiles integrately formed under the cover plate to provide fastening means to the underlying absorber plate with an optimum insulating distance thereto.

12. The collector of claim 11, wherein said cover plate is made of polycarbonate material and co-extruded together with the fixing profiles.

* * * * *